United States Patent
Baldemair et al.

(10) Patent No.: US 11,032,848 B2
(45) Date of Patent: *Jun. 8, 2021

(54) MAC PROTOCOL FOR DIRECTIVE TRANSMISSIONS

(71) Applicant: GUANGDONG OPPO MOBILE TELECOMMUNICATIONS CORP., LTD., Dongguan (CN)

(72) Inventors: Robert Baldemair, Solna (SE); Jonas Kronander, Knivsta (SE); Dennis Hui, Sunnyvale, CA (US); Kumar Balachandran, Pleasanton, CA (US); Nadia Brahmi, Hildesheim (DE)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,072

(22) Filed: Jul. 26, 2019

(65) Prior Publication Data

US 2019/0349990 A1 Nov. 14, 2019

Related U.S. Application Data

(63) Continuation of application No. 15/028,749, filed as application No. PCT/SE2013/051250 on Oct. 25, 2013, now Pat. No. 10,397,951.

(51) Int. Cl.
*H04W 74/08* (2009.01)
*H04W 74/00* (2009.01)

(52) U.S. Cl.
CPC ......... *H04W 74/08* (2013.01); *H04W 74/002* (2013.01); *H04W 74/0816* (2013.01)

(58) Field of Classification Search
None
See application file for complete search history.

(56) References Cited

U.S. PATENT DOCUMENTS

| 10,397,951 B2 | 8/2019 | Baldemair et al. | |
| 2003/0152086 A1* | 8/2003 | El Batt | H04W 74/0816 370/400 |

(Continued)

FOREIGN PATENT DOCUMENTS

WO  WO-2011063295 A1  5/2011

OTHER PUBLICATIONS

Examination Report for European Patent Application No. 13895828. 5, dated May 8, 2018, 6 pages.

(Continued)

*Primary Examiner* — Peter Chen
*Assistant Examiner* — Jeff Banthrongsack
(74) *Attorney, Agent, or Firm* — Hodgson Russ LLP

(57) ABSTRACT

The disclosure relates to radio access systems, and more specifically to methods for media access in radio access systems. The disclosure relates to a method, performed in a first node 20b, 20c, 20d in a wireless communication system, of accessing a shared media for directive signal transmission from the first node, the method comprises three steps. The first step is receiving, from a second node, a pilot signal announcing a directive signal transmission to or from the second node. The second step is predicting based on information in the received pilot signal, a collision rate between an intended directive signal transmission from the first node and the announced directive signal transmission, the information defining the channel resources used by the announced directive signal transmission and the third step is accessing the shared media based on the predicted collision rate. The disclosure further relates to methods for reserving (Continued)

and accessing a shared media in radio access systems, as well as to wireless network nodes.

20 Claims, 12 Drawing Sheets

(56) References Cited

U.S. PATENT DOCUMENTS

2011/0287796 A1    11/2011  Jain et al.
2012/0008568 A1*  1/2012  Gong ................ H04W 74/0875
                                                            370/329

OTHER PUBLICATIONS

International Preliminary Report on Patentability for International Patent Application No. PCT/SE2013/051250, dated May 6, 2016, 14 pages.
Extended European Search Report for European Patent Application No. 13895828.5, dated May 23, 2017, 8 pages.
Gong, Michelle X., et al., "A Cross-layer Approach to Channel Assignment in Wireless Ad Hoc Networks," Mobile Networks and Applications, vol. 12, Issue 1, Feb. 2007, Springer Science + Business Media, LLC, pp. 13-56.
Gong, Michelle X. et al., "A Directional CSMA/CA Protocol for mmWave Wireless PANs," Proceedings of the IEEE Wireless Communications and Networking Conference {WCNC), Apr. 18-21, 2010, Sydney, Australia, IEEE, 6 pages.
Korakis, Thanasis, et al., "CDR-MAC: A Protocol for Full Exploitation of Directional Antennas in Ad Hoc Wireless Networks," IEEE Transactions on Mobile Computing, vol. 7, Issue 2, Feb. 2008, IEEE, pp. 145-155.
Subramanian, Ananth, et al., "Spatial Reuse Strategies in 60 GHz," IEEE 802.11-10/0250r0, Mar. 15, 2010, Institute for Infocomm Research, slides 1-28.
International Search Report and Written Opinion for International Patent Application No. PCT/SE2013/051250, dated Jun. 24, 2014, 17 pages.
EPO, Office Action for EP Application No. 19181775.8, dated Oct. 9, 2019.
EPO, Office Action for EP Application No. 19181780.8, dated Oct. 9, 2019.
USPTO, Office Action for U.S. Appl. No. 16/522,987, dated Jun. 10, 2020.
USPTO, Office Action for U.S. Appl. No. 15/028,749, dated Sep. 8, 2017.
USPTO, Advisory Action for U.S. Appl. No. 15/028,749, dated Jul. 11, 2018.
USPTO, Office Action for U.S. Appl. No. 15/028,749, dated Apr. 2, 2018.
USPTO, Office Action for U.S. Appl. No. 15/028,749, dated Dec. 14, 2018.
SIPO, First Office Action for CN Application No. 201380080440.6, dated Oct. 24, 2018.
SIPO, Second Office Action for CN Application No. 201380080440.6, dated Mar. 11, 2019.
SIPO, Third Office Action for CN Application No. 201380080440.6, dated Jun. 24, 2019.
USPTO, Office Action for U.S. Appl. No. 16/522,987, dated Jan. 12, 2021.

* cited by examiner

MAC PROTOCOL FOR DIRECTIVE TRANSMISSIONS

CROSS-REFERENCE TO RELATED APPLICATIONS

This application is a continuation of U.S. patent application Ser. No. 15/028,749, filed Apr. 12, 2016, which is a U.S. National Phase entry under 35 U.S.C. § 371 from PCT International Application No. PCT/SE2013/051250, filed Oct. 25, 2013, the disclosure of all of which is incorporated herein by reference.

TECHNICAL FIELD

The disclosure relates to radio access systems and more specifically to methods for media access in radio access systems. The disclosure further relates to methods for reserving and accessing a shared media in radio access systems, as well as to wireless network nodes.

BACKGROUND

Today's cellular communication occurs mainly in frequency bands below 3 GHz. However, while LTE can operate over bandwidths of as much as 100 MHz by design, the future radio access system envisaged would operate over bandwidths of the order of 1 GHz. Clearly, such a system could not operate in bands below 3 GHz. The lowest band where the mobile industry may home for spectrum parcels that exceed the 10-40 MHz of contiguous allocations typical for the industry is probably above 3 GHz. Out of the regions of spectrum that are most promising for the mobile industry, the cm-Wave, CMW, region from 3-30 GHz and the mm-Wave, MMW, region from 30-300 GHz are particularly interesting for next generation mobile systems.

Furthermore, the IEEE 802.11 standardization effort is planning amendments termed IEEE 802.11ac and IEEE 802.11ad that will enable very high throughput communication over bandwidths such as 160 MHz for the former and 2 GHz for the latter. 802.11ac will operate in the CMW bands such as the 5 GHz ISM band while 802.11ad is targeting the 60 GHz unlicensed band.

Without specifying the exact band where we would operate the future radio access system, the next standard is assumed to operate over bandwidths that range from 100 MHz to 2.5 GHz in dense deployments.

The resulting system can be used in a variety of scenarios:
1) Point-to-point communications for short range radio systems
2) Access links for a Future Radio Access, FRA, system that provides very high speed connectivity or
3) Backhaul links between densely deployed nodes that provide a high throughput pipeline to a network operator's core network; this core network would connect to the Internet and provide access to data and multimedia services.

One of the challenges of operating at MMW frequencies is the received power that decreases with frequency when using omnidirectional antennas because the antenna aperture—which determines how much power is received—decreases with frequency for an omnidirectional antenna and thus also the received power. To overcome this problem antenna area can be increased leading to directive antennas, Generally speaking, directive antennas and beam forming become an important component for MMW communication.
CSMA/CD Carrier Sense Multiple Access/Collision Avoidance, CSMA/CA, is a contention based medium access mechanism used in the 802.11 standards to allow distributed coordination of the resources among users contending for the medium. In this disclosure CSMA/CD is referred to as an example of a contention based MAC protocol. CSMA/CD is therefore briefly described.

FIG. 1 illustrates a four-way handshaking in a CSMA/CA system based on Request-To-Send/Clear-To-Send, RTS/CTS. In FIG. 1, a first node, user A, wants to send a data packet to another node, user B. User A then sends an request to send, RTS, to the intended receiver. If the receiver is ready to receive, it broadcasts a clear to send, CTS, message, After receiving the CTS, the sender transmits the packet.

All other nodes that receive the RTS or CTS refrain from transmission. This mechanism addresses the hidden/exposed terminal problem, described below.

To control the access to the medium, CSMA/CA uses inter-frame spaces, IFS, during which a node has to wait before sensing the channel and determining whether it is free. The 802.11 standard specifies different IFSs to represent different priority levels for the channel access: the shorter the IFS, the higher the priority. For instance, Short IFS, SIFS, is used for immediate acknowledgement of a data frame and Distributed Coordination Function IFS, DIFS, is used to gain access to the medium to transmit data, as further illustrated in FIG. 1.

Furthermore, to allow virtual carrier sensing, every data frame may contain the time needed for its transmission including the ACK, based on this information other nodes, here user C, will maintain a Network Allocation Vector, shown as NAV in FIG. 1, to determine when they should sense the medium again. The NAV is decremented by clock and no access is allowed as long as its value is above 0. The node will again sense the medium after NAV and the subsequent DIFS.

In addition, in order to avoid situations where two nodes transmit at the same time leading to a collision, every node needs to wait for the medium to become free and then invoke the back off mechanism. For this, each node selects a random back off interval, illustrated by the checked box in FIG. 1, within [0, CW], where CW is called the contention window and is initialized to a value CWmin.

The node decrements the backoff timer every idle time slot until the counter reaches 0 and the node sends the packet. The CWmin is doubled on each collision until it reaches a maximum threshold called CW max.

Beam Forming

Beam forming is a general set of techniques to control the radiation pattern of a radio signal. One way of achieving this is to use several fixed antenna elements. The total antenna pattern can be controlled by adjusting the transmit weights of the signal components radiating from each individual antenna element. The beam forming coefficients can be calculated to direct the transmitted energy towards the position of the intended receiver, while simultaneously reducing the amount of energy radiated in unwanted directions.

Transmit beam forming is a key enabler for enhancing the capacity and the energy efficiency in a cellular network and is therefore of major importance in future radio access systems. The received signal strength is increased due to the increased antenna gain resulting from the beam forming operation. At the same time interference is spread over a smaller area, typically resulting in reduced interference levels for all users in the system. Increased Signal to Interference and Noise, SINR, results in higher bit-rates and higher capacity. Higher SINR in a packet oriented system results in shorter packet transmission times. This also helps to reduce the energy consumption in the system since transmitters and receivers can be put into idle mode during a larger ratio of time.

In the simplest form an antenna radiation pattern can be described as pointing in a certain direction with a certain beam width. The direction of the maximum gain of the antenna pattern (usually denoted boresight) can be described as a vector with a vertical component (usually denoted elevation or antenna tilt) and a horizontal component (usually denoted azimuth). The beam width also has two dimensions, one vertical and one horizontal.

Receive beam forming uses the reciprocity of transmit and receive paths to apply directionality towards the receiver. Like transmit beam forming, one way to achieve directivity is to use a number of fixed antenna elements which phases are controlled to steer the direction of the resultant antenna pattern.

The gain of a directive antenna (i.e. the gain by how much the desired signal is amplified over the signal of an omnidirectional antenna) increases with decreasing beam width. The narrower the generated beam the higher the antenna gain.

A well-known problem of contention based MAC protocols when used together with beam forming are hidden nodes. See FIGS. 2a and 2b for a graphical illustration. In FIG. 2a two transmitters, 20a and 20b, are both contending for the medium—and thus listen to the medium—may not hear each other due to the directive transmissions of the other. At the destination node, 10a,—since both nodes want to communicate with the same node they direct their respective beams towards the common receiver—a collision occurs.

One well known possible way to mitigate this problem is that each transmitter sends prior to the directive transmission an omni-directional pilot signal as illustrated in FIG. 2b. For example, the RTS and CTS described above may be implemented as omnidirectional pilots. Contending transmitter in the neighbourhood can overhear the omni-directional pilot transmission and refrain from accessing the medium.

One drawback with this solution is that it may be overly pessimistic: It avoids all simultaneous transmissions in a neighbour using the same resources. If all transmissions are intended for the same reception node this is also desirable. And all transmissions in the neighbourhood are avoided until the entire message exchange sequence is finished as described above in the description of the NAV). However, if not all transmissions are intended for the same receiving node this approach becomes overly pessimistic since even non-colliding transmissions are avoided, see FIG. 3. In FIG. 3 two user equipments 20a, 20b want to communicate with two access nodes 10a, 10b, respectively. Since directed into different directions their transmissions do not collide. However, the omni-directional pilot signals sent by the user equipments 20a, 20b are overheard by the user equipments 20b, 20a, respectively, and therefore both user equipments apply a random back-off according to the MAC protocol.

SUMMARY

In this disclosure we line out several approaches concerning how to make medium reservation more efficient i.e. how to adopt it such that only colliding directive transmissions are prevented. According to one aspect, the disclosure relates to a method, performed in a first node in a wireless communication system, of accessing a shared media for directive signal transmission from the first node, the method comprises three steps. The first step is receiving, from a second node, a pilot signal announcing a directive signal transmission to or from the second node. The second step is predicting based on information in the received pilot signal, a collision rate between an intended directive signal transmission from the first node and the announced directive signal transmission the information defining the channel resources used by the announced directive signal transmission and the third step is accessing the shared media based on the predicted collision rate. The proposed method mitigates the problem of hidden nodes for directive transmissions, e.g. because in contrast to prior art the pilot signal comprises information defining the channel resources used by the announced directive signal transmission, resulting in (space-wise) more confined medium reservations. More narrow medium reservations typically result in less waiting time and more transmission opportunities which increases system throughput.

According to one aspect, the intended directive signal transmission from the first node and the announced directive signal transmission are at least partly overlapping in time domain. With the proposed technique, transmissions overlapping in the time domain may coexist as long as the channel resources are not interfering. Or at least as long as interference is below a certain level. By using information defining the channel resources used by the announced directive signal transmission, which are included in a pilot signal, a transmitting node may predict a collision rate and access the media in an efficient way.

According to one aspect, the step of predicting a collision rate comprises estimating the interference between the intended directive signal transmission from the first node and the announced directive signal transmission between the second node and the at least one further node. By estimating the interference a transmitting node may compare the interference with a predefined acceptance level and base decisions on the comparison.

According to one aspect, the method of accessing a shared media further comprises the step of adopting the intended directive signal transmission from the first node in order to avoid collision between the intended directive signal transmission from the first node and the announced directive signal transmission between the second node and at least one further node. Because, the transmission may be adopted in space and/or time and/or frequency, even more effective resource allocation is possible.

According to one aspect, the prediction is based on a source and/or destination identity of the directive signal transmission between the second node and at least one further node, comprised in the pilot signal. Use of identities may assist a receiving node to determine the collision rate.

According to one aspect, the prediction is based on spatial information of the directive signal transmission between the second node and at least one further node, comprised in the pilot signal.

According to one aspect, the prediction is based on frequency information of the directive signal transmission between the second node and at least one further node, comprised in the pilot signal. By knowing which frequency is used for a transmission one way to avoid a collision is to use another frequency.

According to one aspect, the disclosure relates to a method, performed in a second node in a wireless communication system, of reserving a shared media for directive signal transmission to or from the second node. The method comprises three steps. The first step is configuring a pilot signal to announce a directive transmission. The second step is including in the pilot signal information defining the channel resources used by the announced directive signal transmission, the information enabling a receiving node to predict a collision rate between a potentially colliding intended directive signal transmission from the receiving node and the announced directive signal transmission. The third step is transmitting the pilot signal to reserve the shared media.

According to one aspect, the present disclosure relates to a first node in a wireless communication system. The first node is configured for accessing a shared media for directive signal transmission from the first node to at least one further node on a shared media. The first node comprises a communication unit and processing circuitry. The processing circuitry are adapted to receive, using the communication unit, from a second node, a pilot signal announcing a directive signal transmission to or from the second node.

The processing circuitry is further configured to predict, based on information in the received pilot signal a collision rate between an intended directive signal transmission from the first node and the announced directive signal transmission, the information defining the channel resources used by the announced directive signal transmission and access, using the communication unit, the shared media based on the predicted collision rate.

According to one aspect, the disclosure relates to a second node in a wireless communication system, the second node being configured reserving a shared media for directive signal transmission between the second node and at least one further node on a shared media, the second node comprises a communication unit and processing circuitry. The processing circuitry are adapted to configure a pilot signal to announce a directive transmission. The processing circuitry are further adapted to include in the pilot signal information defining the channel resources used by the announced directive signal transmission, the information enabling a receiving node to predict a collision rate between a potentially colliding intended directive signal transmission from the receiving node and the announced directive signal transmission. The processing circuitry are further adapted to transmit, using the communication unit, the pilot signal to reserve the shared media.

The nodes are further adapted to implement the variants of the disclosure described in relation to the methods above.

DETAILED DESCRIPTION

Figure 1:
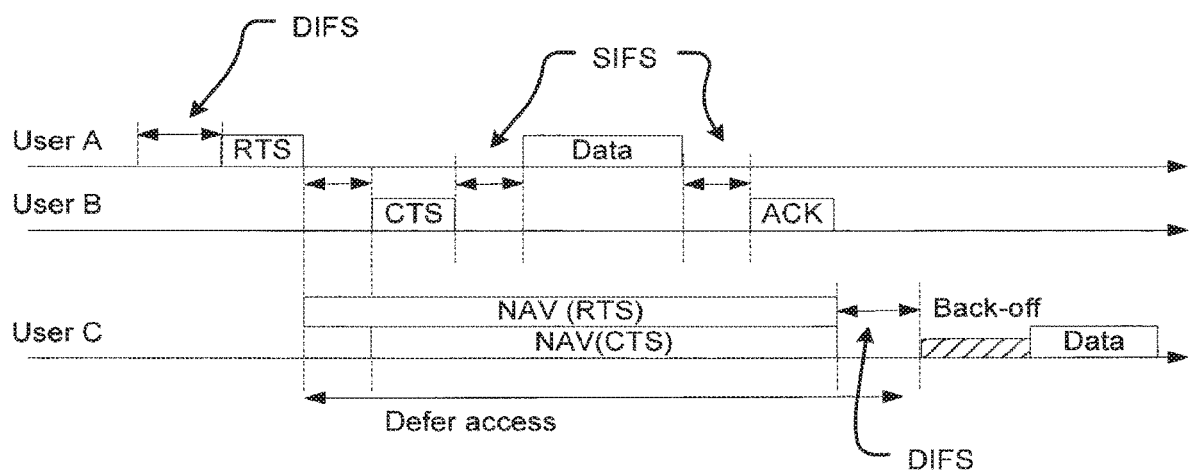
FIG. 1 illustrates RTS/CTS handshake for collision avoidance in CSMA/CA
Figure 2A:
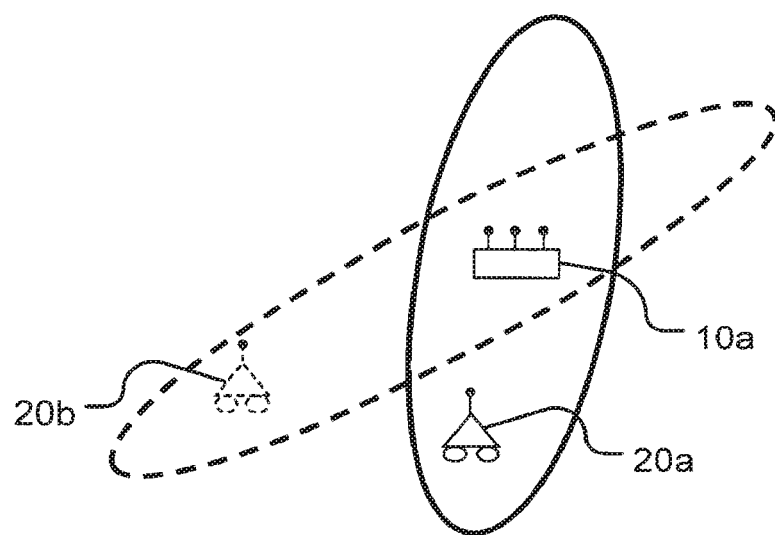
FIG. 2a illustrates the hidden node problem.
Figure 2B:
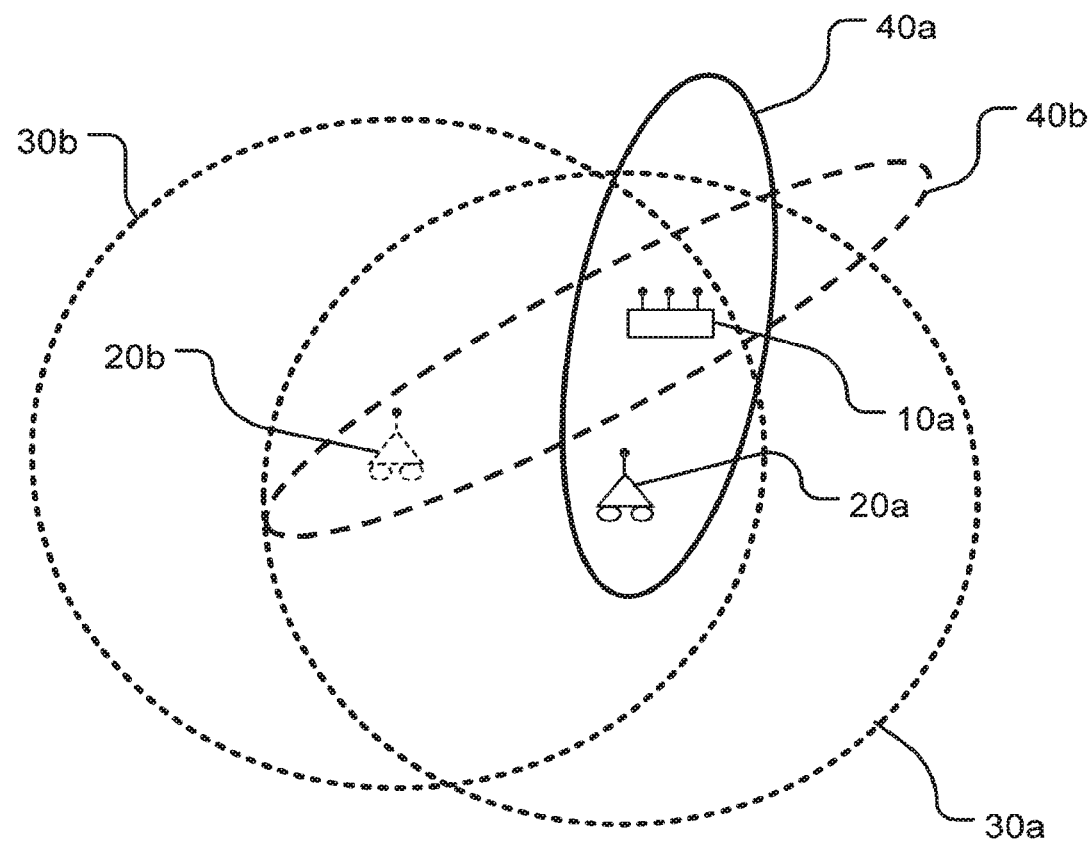
FIG. 2b illustrates using omni directive pilot signals to reduce the hidden node problem.

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

In this application several approaches are presented, wherein pilot signals are used for medium reservation. According to the proposed technique, the pilots contain additional information, such as access node ID, location information etc. The different types of additional information may be comprised in the pilot signals in any combination, depending on the implementation. This additional information enables a potential colliding transmitter when receiving the pilot signal to determine if also directive transmissions from the receiving node would collide or only the pilots.

The presented technique adresses contention based radio access systems as described above. These communication system typically operates on the super high frequency band above 3 GHz.

Embodiments of the present disclosure are in general directed, to a CSMA/CD system as described above. However, it must be understood that the same principle is applicable in other systems, where nodes are competing for a channel. Such a system may comprise both scheduled and contention based transmissions in any combination. The proposed solution enables more efficient spatial reuse than possible in prior art solutions. The technique is applicable to use in any MAC protocol, in particular in any of the MAC protocols specified in IEEE 802.11 standards. The proposed technique may in some cases only be used in a certain aspect, e.g. only during the initial access of a communication system that has both scheduled and contention-based modes of operation. It may even be used in a dynamical spectrum sharing scenario (over unlicensed or shared spectrum with registered usage), where multiple different communication systems co-exists where the only common knowledge is where a common pilot channel is located. The disclosure is in particular applicable but not limited to situations where directive communication transmissions are used.

As the surrounding environments of a transmitter and its receiver can be quite different from each other, trying to draw inference about the presence of a nearby destination node from the transmission of a source node can often lead to an erroneous conclusion. The medium may be more effectively protected through omnidirectional pilots transmitted by the destination node, i.e. the intended receiver of the directional transmission, instead of the source node.

Pilot signals refer in general to signals transmitted over a communications system for supervisory, control, equalization, continuity, synchronization, or reference purposes. Pilots can be transmitted from the source node and/or the destination node of a transmission link. The pilots described in this application typically serve the purpose of announcing a future or ongoing transmission in order to reserve a shared media while avoiding collision and/or interference. According to a typical example, the pilot signal is a request to transmit data, RTS, described above, which is transmitted before the actual data transmission.

According to one aspect of the disclosure, the pilot signals referred to in the embodiments below comprises a clear to send message. As described above, CTS can be sent in response to a request to send, RTS. The CTS may be considered a pilot signal in the sense that it announces the acknowledged data transmission.

Pilots can be transmitted omni-directional or beam formed. To ensure similar reach of beam-formed (directive) transmissions and omni-directional pilots signals, the latter needs to be long to ensure that a receiver receives them with sufficient energy to enable decoding. However, not to waste too many system resources it is proposed to make omni-directional pilot signals narrow in frequency domain and long enough in time.

An example method, performed in a first node in a wireless communication system, of accessing a shared media for directive signal transmission from the first node will now be described in relation to the flow chart of FIG. 4. The method is e.g. performed in a system of FIG. 3 wherein two nodes 20a, 20b, here user equipments, are about to transmit data to a respective access point 10a, 10b in the wireless communication system. As described above the user equipments 20a and 20b would then overhear each other's pilots. Hence, according to prior art, they may in this scenario both refrain from sending. The proposed method overcomes this problem. The method comprises three steps.

The first step is, receiving S1 from a second node 20a, a pilot signal 30a announcing a directive signal transmission 40a to or from the second node 20a. The pilot signal contains additional information defining the channel resources used by the announced directive signal transmission 40a, such as access node ID, location information etc. The used channel resources are the physical part of the media corresponding to the directive transmission that is actually used by the announced transmission.

Hence, the physical resources correspond e.g. to a physical coverage area and frequency and/or time of the transmission. However, the information must not be the physical parameters as such, but may as well be another parameter, e.g. an identifier, which enables the receiving node to draw conclusions regarding the channel resources. Hence, this additional information enables a potential colliding transmitter when receiving the pilot signal to determine if also directive transmissions would collide or only the pilots, Hence, the pilot signal comprises information that a receiving node interprets in order to get more facts about the announced transmission. The announced transmission may be directed to or from the second node announcing the transmission, as will be further described below.

The second step is predicting S2 based on information in the received pilot signal 30a, a collision rate between an intended directive signal transmission 40b from the first node 20b and the announced directive signal transmission 40a. Collision rate corresponds to how much the announced transmission is affected by an intended transmission. Two transmissions that are not overlapping in space and/or time and/or frequency do not collide. Collision rate may be predicted e.g. by making an interference calculation as will be described below. Collision rate is typically high for transmissions having the same destination.

According to one aspect, the intended directive signal transmission 40b from the first node 20b and the announced directive signal transmission 40a are at least partly overlapping in time domain. Transmissions overlapping in the time domain may coexist as long as the channel resources are not interfering, or at least as long as interference is below a certain level. By using information defining the channel resources used by the announced directive signal transmission, which are included in a pilot signal, a transmitting node may predict a collision rate and access the media in an efficient way.

According to one aspect, the step of predicting S2 a collision rate comprises estimating the interference between the intended directive signal transmission from the first node 20b and the announced directive signal transmission between the second node and the at least one further node. Predicted interference may be used as a measure of collision rate. In principle if interference is high collision rate will also be high. Hence, the nodes will do geometric calculations to conclude if its intended transmissions will interfere or not. The form and the implementation of these calculations is not part of the present disclosure.

The third step is accessing S3 the shared media based on the predicted collision rate. Accessing the media typically comprises signal transmission. This may be either as a request to send, RTS, or as a transmission which is not preceded by an RTS, According to one aspect, the method of accessing a shared media, further comprises the step of adopting, step S2b in FIG. 4, the intended directive signal transmission from the first node in order to avoid collision between the intended directive signal transmission from the first node and the announced directive signal transmission between the second node and at least one further node. The transmission is then adopted before transmission in order to keep the interference below a predetermined level. This may imply adopting the beam or the spatial properties of the signal. The adoption may also be in the time and/or frequency domain.

According to one aspect, the prediction S2 is based on frequency information of the directive signal transmission between the second node 20a and at least one further node 10a, comprised in the pilot signal 30a. Frequency information may also be used for determining interference. The frequency information indicates e.g. at what frequency (band, sub band, or set of subcarriers) the announced transmission is using. That is, on what frequency (band, sub band or set of subcarriers) the transmitter intends to transmit the upcoming transmission. The frequency information is present in the pilot signal to limit the reservation to only the relevant communication resources and to allow other concurrent transmissions to take place on other resources.

According to one aspect, the prediction S2 is based on a source and/or destination identity of the directive signal transmission between the second node 20a and at least one further node 10a, comprised in the pilot signal 30a. An example of using identity information will now be described referring to FIGS. 6a and 6b.

Figure 3:
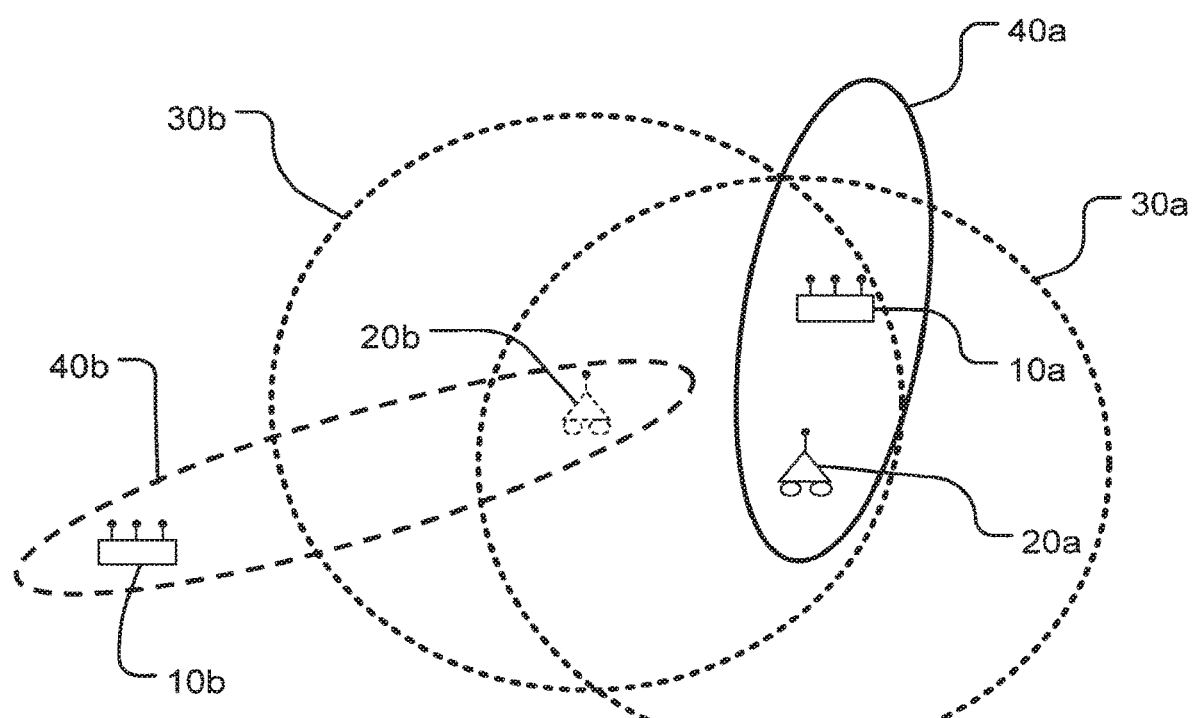
FIG. 3 illustrates omni-directional pilots refraining transmissions even when the directive transmissions do not collide.
Figure 4:
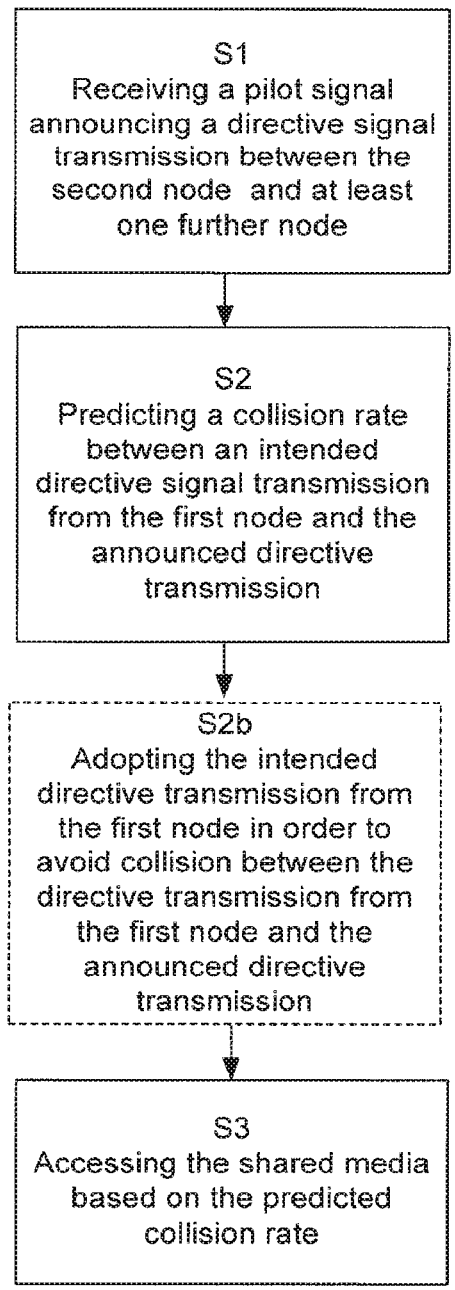
FIG. 4 is a flowchart illustrating method steps executed in a node receiving a pilot according to one aspect of the disclosure.
Figure 6A:
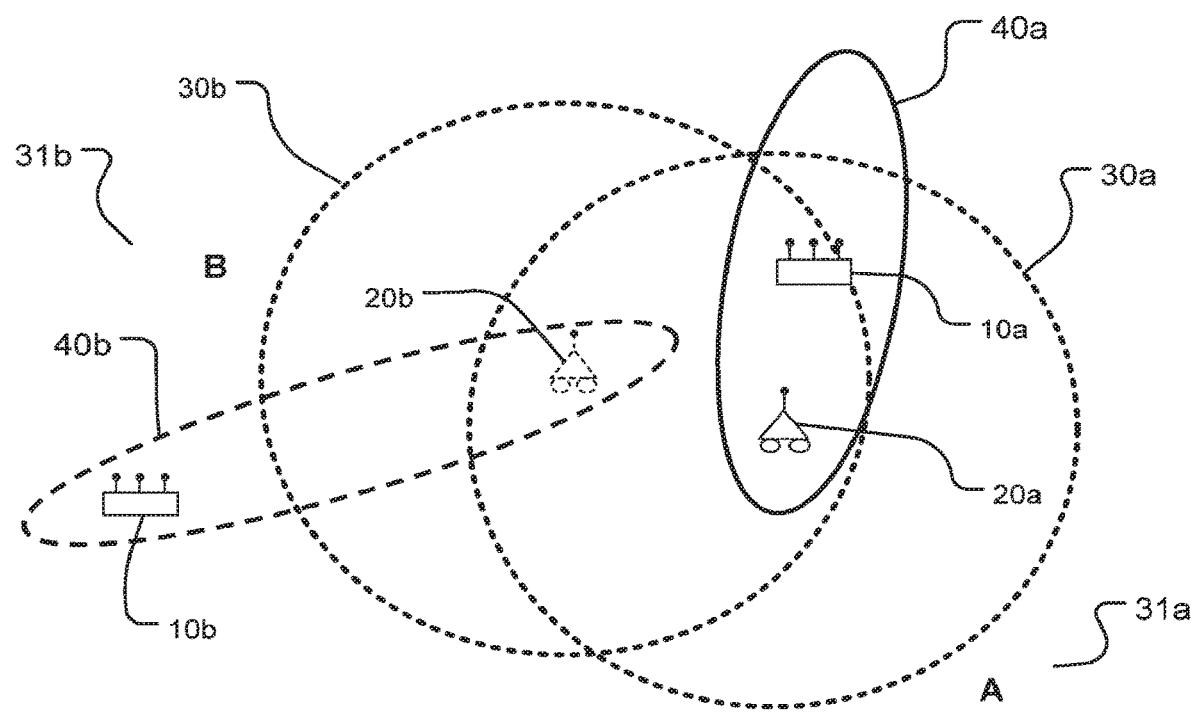
FIG. 6a illustrates omni-directional pilot signal containing an identity according to one aspect.

As shown in FIG. 3, medium reservation based on omni-directional pilot signaling is generally pessimistic, because in prior art solutions a node will always refrain from sending when it hears a pilot signal from another node. Hence, when using omni-directional pilots, even transmissions directed towards different access nodes will be blocked, even if directive transmissions would not collide. According to this aspect of this disclosure, it is therefore proposed to include in the pilot signals the identity of the access node the transmitting node intends to communicate with. Hence, according to this aspect, the identity is a node identity. This is illustrated in FIG. 6a, where the second node 20a sends an omni-directional pilot 30a, comprising an identity 31a having the value G1 and where the first node 20b sends an omni-directional pilot 30b, comprising an identity 31b having a value G2. A receiving node receiving the omni-directional pilot signal will only refrain from performing a transmission if the received access node identity coincides with the own target access node, otherwise it will transmit.

One prerequisite for this idea to work is that each access node has an identity assigned to it. For example, in an LTE cellular network, this identity could be (or be based) on the physical layer cell identity. In a WLAN network such as a Wi-Fi network, this identity could be (or be based on) the MAC address of the access point (IEEE 48 bit address), or a predetermined number P of the least significant bits of the IP address, the P bits covering the maximum size of the sub network or the maximum number of expected nearest neighbors. An access node joining a network obtains as part of the association procedure (with the network) such an identity.

Even though outlined so far from a terminal-to-access-node transmission point of view, this idea can be generalized to access-node-to-terminal transmissions as well or more general even to any-node-to-any-node transmissions. It does not matter which transmissions lead to a collisions at which node, any collision is bad. Therefore, each node (terminals, access nodes, relays, etc) are associated with an identity. If node A intends to communicate with node B it will send an omni-directional pilot signal including identity B. Any node overhearing this transmission will refrain from performing a transmission to node B but not otherwise, Every node joining a network will obtain its identity during the association procedure. In addition to the node identity even the duration for which the medium is reserved can be included in the omni-directional pilot signal.

In another variant of this embodiment, the node identity is a group identity of a group of nodes in the wireless communication system, Hence, the identity which represents a group of nodes is transmitted with the omni-directional pilot signal. If two nodes are (radio-wise) close to each other transmissions directed to each of them may interfere with the other, even though the destination nodes are different. It is therefore proposed to group (radio-wise) close nodes into groups and to include this group identity into the omni-directional pilot signal. One node can belong even to multiple groups; for fixed or static nodes, this may typically correspond to grouping nodes that are close along a particular azimuth or a particular beam-identifier associated with a certain direction of transmission. Mobile nodes may combine several possible directions of transmission into a single group identifier, with the omni-directional association being a natural and trivial extension that encompasses all addressable directions. See FIG. 6b for a graphical illustration of five nodes being grouped in two groups.

Figure 6B:
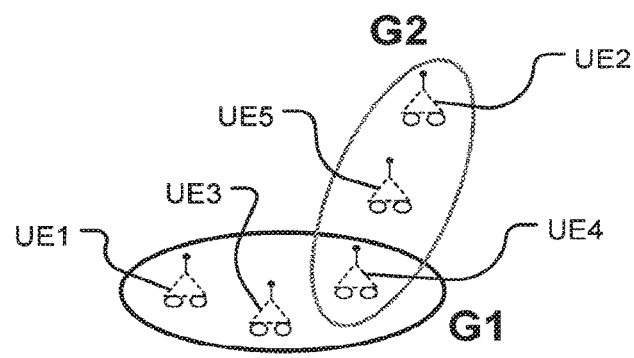
FIG. 6b is illustrates how radio wise close nodes can be assigned a group identity.

In FIG. 6b the potential collision from simultaneous transmissions between UE1 to UE4 and UE2 to UE5 is avoided by introducing the group identifiers.

The assignment of nodes into groups is part of joining a network. One example how to perform grouping could be based on the path gain metric between nodes, i.e. nodes with small path gains towards each other are based into the same group. There exist several methods how to obtain the path gain matrix or even other methods how to perform grouping which are all outside the scope of this disclosure.

One example implementation of how to assign group identifiers is to execute the following steps:
1. Start by measuring the path gain matrix of the links between all nodes in the system; the case with multiple directions of transmission can be handled by virtualizing each node into multiple nodes, each direction (which could be a beam or a group of beams or even any direction within a certain chordal distance away from a chosen centroid) corresponding to a particular logical node.
2. Introduce a threshold parameter T.
3. Vary the threshold parameter and apply it to the links in the path gain matrix, i.e. all links with higher gain than Tare marked by an indicator, resulting in e.g. a boolean indicator matrix to be true. The threshold could be chosen so that approximately 50% of the links are marked by an indicator.
4. Assign a unique group ID to a first UE.
5. Assign the same unique group ID to all UEs that are connected, as indicated via the indicator matrix, to the first UE.

Repeat steps 4 & 5 for all UEs. (Each UE will now have several IDs), in the FIG. 6b:

UE1 will have IDs 1,3,4
UE2 will have IDs 2,4,5
UE3 will have IDs 1,3,4
UE4 will have Ds 1,3,4, 2,5
UE5 will have IDs 2,4,5

Analyze the structure of the indicator matrix, make it block diagonal if possible to find the number of unique group ID's that is needed. In the case of FIG. 6b, there are only 2 numbers needed.

The below matrix illustrates the group ID assignment process applied to the case of FIG. 6b above.

$$\begin{array}{c} \text{nodes} \\ \overbrace{\begin{array}{ccccc} 1 & 2 & 3 & 4 & 5 \end{array}} \\ \begin{pmatrix} 1 & 0 & 1 & 1 & 0 \\ 0 & 1 & 0 & 1 & 1 \\ 1 & 0 & 1 & 1 & 0 \\ 1 & 1 & 1 & 1 & 1 \\ 0 & 1 & 0 & 1 & 1 \end{pmatrix} \left.\begin{array}{c} 1 \\ 2 \\ 3 \\ 4 \\ 5 \end{array}\right\} \text{nodes} \end{array}$$

From the first matrix rows and columns are exchanged.

$$\begin{array}{c} \text{nodes} \\ \overbrace{\begin{array}{ccccc} 1 & 3 & 4 & 2 & 5 \end{array}} \\ \begin{pmatrix} 1 & 1 & 1 & 0 & 0 \\ 1 & 1 & 1 & 0 & 0 \\ 1 & 1 & 1 & 1 & 1 \\ 0 & 0 & 1 & 1 & 1 \\ 0 & 0 & 1 & 1 & 1 \end{pmatrix} \left.\begin{array}{c} 1 \\ 3 \\ 4 \\ 2 \\ 5 \end{array}\right\} \text{nodes} \end{array}$$

Then two groups may be created by giving adjacent nodes the same number as illustrated below.

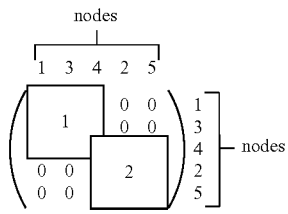

Hence in this example two groups 1, 2 are created, which is also illustrated in FIG. 6b.

In one variant of this disclosure the intended receiving node answers with an omni-directional pilot signal including its own identity and potentially how long the medium will be reserved. This prevents other nodes from sending to the receiving node which have been out of reach of the omni-directional pilot signal of the first transmitting node.

According to another aspect of the proposed technique, the prediction S2 is based on spatial information of the directive signal transmission between the second node 20a and at least one further node 10a, comprised in the pilot signal 30a. Spatial information is data defining the physical location of the transmission and comprises e.g. position and/or directional information, which is now, explained referring to FIG. 7.

Consider e.g. the message exchange sequence RTS-CTS-DATA-ACK; however other message exchange sequences are possible, e.g. such including block-acknowledgements. To allow spatial reuse of the resources one possibility is to add spatial information to the RTS and CTS messages.

Figure 7:
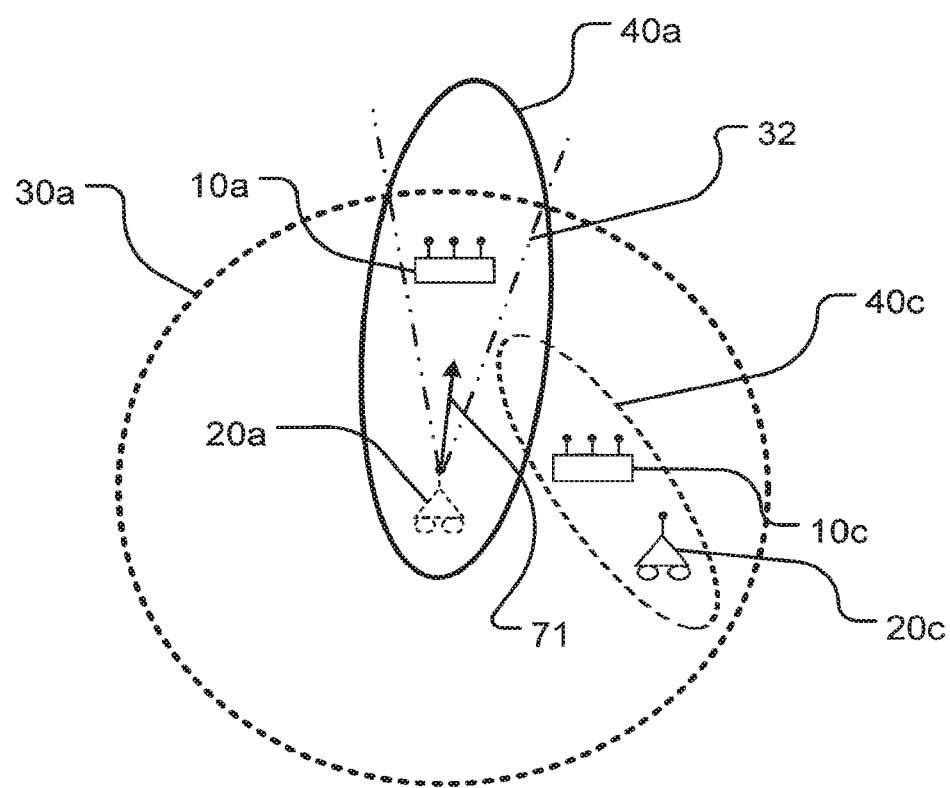
FIG. 7 illustrates reservation of a medium using spatial information according to one aspect of the disclosure.

In FIG. 7 the RTS and CTS messages are transmitted using omni-directional transmission. RTS and CTS contain the position of the transmitting node 20a. This information is available via available positioning services. Another alternative is intended transmission direction 71 (Available from the internal gyroscope) and compass in the device and the intended transmission beam width.

The RTS and CTS also contain the standard NAV vector indicating the temporal reservation of the channel for the communication. The RTS is transmitted from the source node (source node=the transmitter of the RTS and the subsequent data) using an onmi directional transmission.

The CTS is transmitted from the destination node (Destination node=receiver of the RTS and subsequent data transmission=transmitter of the CTS) using an omni directional transmission.

Figure 8A:
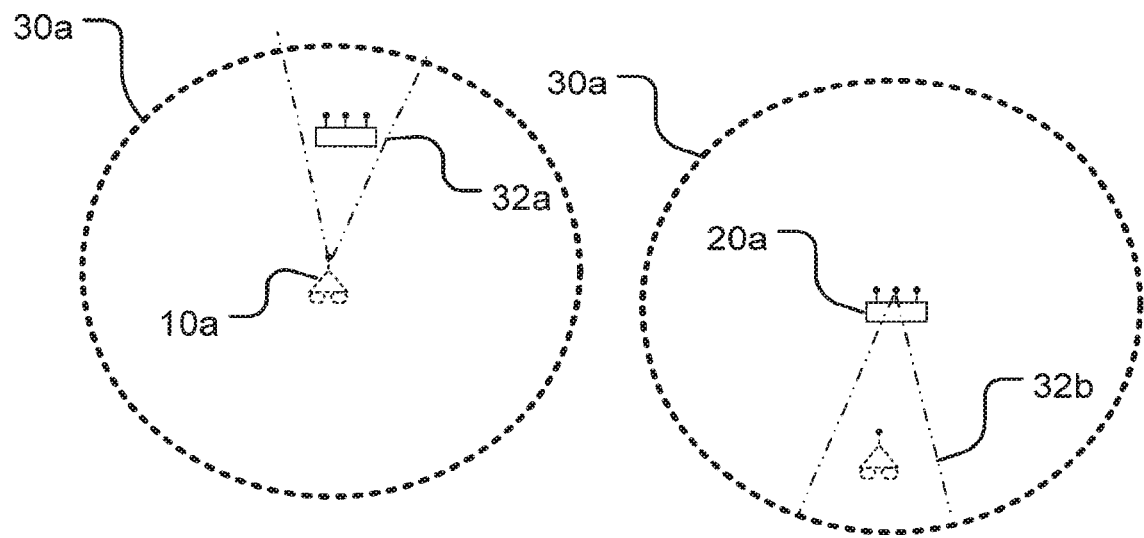
FIGS. 8a and 8b are visual illustrations of the information transmitted in a pilot signal and the resulting spatial reservation.
Figure 8B:
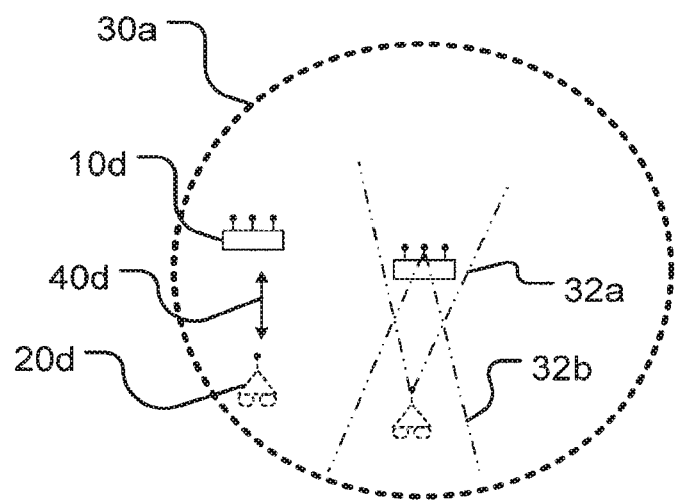

This implies that the entire message exchange sequence RTS-CTS-DATA-ACK is protected from interference from other nodes that receives and decodes the RTS and CTS messages. Since the RTS and CTS are sent using omni directional transmissions nodes in any direction from the source or destination node, adjacent nodes will be informed of the upcoming transmission, and hence be able to judge if they may spatially reuse the channel without interfering with the announced transmission. FIGS. 8a and 8b are example embodiments illustrating the benefit of including the new information in the RTS. Without the information the entire area 30a would be blocked for transmissions during the entire message exchange between the access point 20a and the user equipment 10a. With the information only the area 32 in between the dash-dotted lines is reserved and access point 10d may transmit to user equipment 20d at the same time as user 20a equipment transmits to access point 10a. Hence, these overhearing nodes will do some simple geometric calculations to conclude if its intended transmission will interfere or not. The exact form and implementation of these calculations are not part of the present disclosure.

FIG. 8a is a visual representation of the information 32a, 32b transmitted in the RTS and the CTS messages. The resulting spatial channel reservation 32 is illustrated in FIG. 8b. In FIG. 8b nodes 10d and 20d listening to the pilot signals, can communicate without delay, because the information comprised in the pilot signals makes it possible for the nodes to determine, that directed transmissions between nodes 10d and 20d will not interfere with the transmissions between nodes 10a and 20a.

Figure 5:
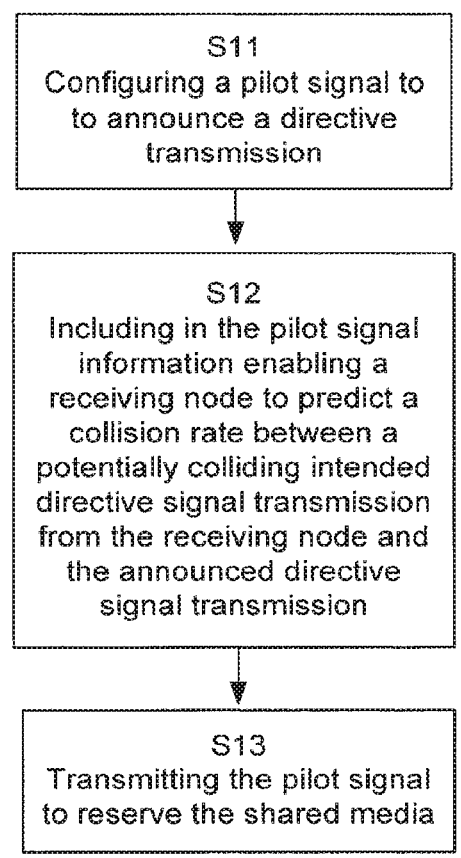
FIG. 5 is a flowchart illustrating method steps executed in a node transmitting a pilot according to one aspect of the disclosure.

According to one aspect, the disclosure relates to a method, performed in a second node 20a in a wireless communication system, of reserving a shared media for directive signal transmission to or from the second node 20a. The method will now be further explained referring to FIG. 5. The method is typically executed by a node that is about to transmit data to another node in the wireless communication system. Hence, in a first example the announced directive signal transmission is a signal transmission 40a from the second node 20a to another node in the wireless communication system. The method is applicable to all examples described above in FIGS. 6 to 8b. The method comprises three steps.

The first step is configuring S11 a pilot signal 30a to announce a directive transmission 40a. The pilot signal is e.g. a RTS message as described above.

The second step is including S12 in the pilot signal 30a information defining the channel resources used by the announced directive signal transmission 40a. "Defining" implies that a receiving node may derive which physical channel resources are used by analysing the included information. Physical channel resources can be at least one of time, frequency and/or space. The information is e.g. as access node ID, location information, medium reservation times, frequency, etc. This additional information enables a potential colliding transmitter when receiving the pilot signal to determine if also directive transmissions would collide or only the pilots. Hence, the information is enabling a receiving node such as node 20b in FIG. 6a, node 20c in FIG. 7 or node 20d in FIG. 8b, to predict a collision rate between a potentially colliding intended directive signal transmission, 40b in FIG. 6a, 40c in FIG. 7 or 40d in FIG. 8b, from the receiving node and the announced directive signal transmission 40a, as described in connection with FIG. 4. It is refered to the description above for more information about what type of information may be comprised in the pilot signals.

According to a further aspect pilot signals may in addition to information defining the channel resources contain NAV information to reserve the medium. The nodes may then know which channel resources are used in a spatial domain and when the resources are occupied in the time domain.

According to a further aspect pilot signals comprises frequency information of the directive signal transmission 40a between the second node and the at least one further node. If frequency is included the nodes may then also know which frequency resources are occupied and utilise this as described above. The resource allocation may then be optimised using this information.

The third step is transmitting S13 the pilot signal 30a to reserve the shared media. The location of the designated radio resource for the Omni-directional transmission in the time-frequency plane is generally tied to the location of the radio resource used for the directional transmission. It may be located on a separate frequency band possibly in a lower frequency range than that of the directional transmission to achieve a larger coverage area. In order to avoid transmitting and receiving at the same time using the same radio, a separate radio may be needed to support the omni-directional transmission while receiving the directional transmission. Alternatively, the designated radio resource may simply be a time instance or time slot that is different from that of the directional transmission.

According to one aspect, the pilot signal 30a is omni-directional as in the examples above. However, the pilot signal may as well be a directive transmission.

Figure 9:
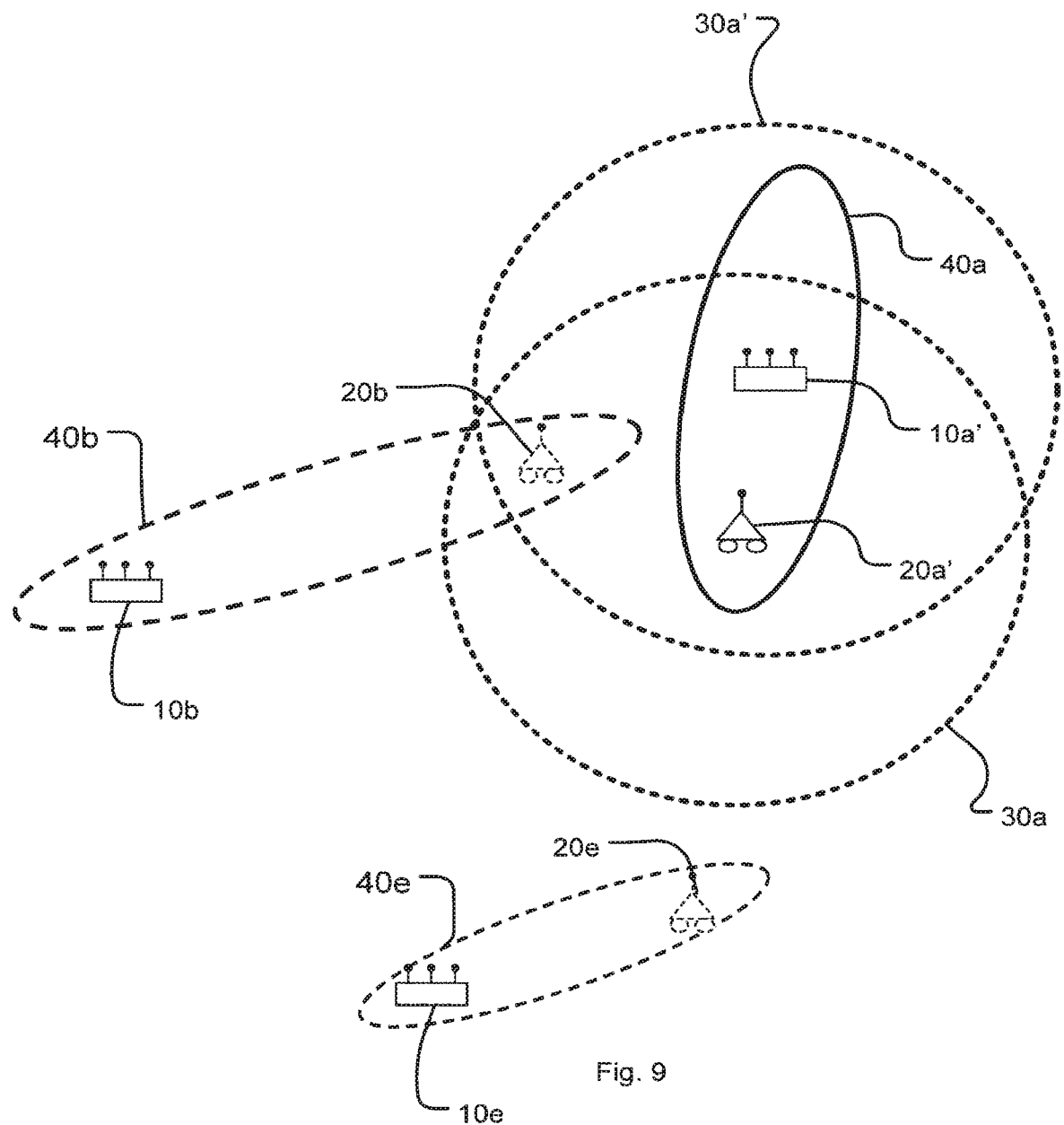
FIG. 9 illustrates transmitting omni-directional pilot signals from destination.

According to one aspect of the present disclosure, which is illustrated in FIG. 9, the announced directive signal transmission is a signal transmission 40a from a further node 20a' to the second node 10a'. As the surrounding environments of a transmitter and its receiver can be quite different from each other, trying to draw inference about the presence of a nearby destination node from the transmission of a source node can often lead to an erroneous conclusion. The medium may be more effectively protected through omni-directional pilots 30a' transmitted by the destination node 10a', i.e. the intended receiver of the directional transmission, instead of the source node 20a'. The presented technique of including in the pilot signal information defining the channel resources used by the announced directive signal transmission is applicable to this type of pilot signals as well.

According to one embodiment of the disclosure, as illustrated in FIG. 9, when a source node, 20a', transmits data to a destination node, 10a' through directional transmission via beam forming, destination node 10a' responds potentially multiple times, e.g. periodically by transmitting an omni-directional pilot signal 30a' on a different but designated radio resource to its surrounding so that a nearby node 20b can sense the omni-directional pilot signal and refrain from transmitting so as to avoid causing interference to the reception at destination node 10a'. The omni-directional transmission may contain information regarding the remaining duration of the directional transmission so that the nearby node 20b may know how long it should wait before sensing the medium again. If a transmitter 20e cannot hear the omni-directional transmission, it should be far enough from the intended receiver, 10a', of the directional transmission 40a that the directional transmission of transmitter 20e to access point 10e would have minimal impact to destination node 10a'.

Figure 10A:
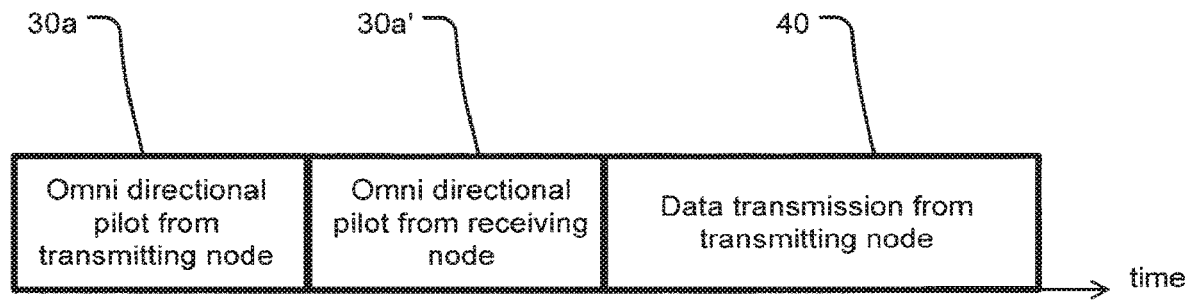
FIG. 10a illustrates the timing, when the designated radio resource for the pilot signals are time instances or time slots that are different from that of the directional data transmission.

An example of sending pilots from destination is described below in connection with FIGS. 10a and 10b, Here a source node 20a', in this example a user equipment, sends data to an access point 10a'. In order to protect the reception of the ACK/NACK information at the source node 20a' the destination node 10a' regularly transmits an omni-directional signal 30a' along with the directional data or node identity, so that any potential transmitter can sense the pilot signal and refrain from transmitting. The timing of a transmission is illustrated in FIG. 10a. In FIG. 10a the pilot signal from transmitting node 30 and the pilot signal from destination node 30' are preceeding the data transmission 40.

Figure 10B:
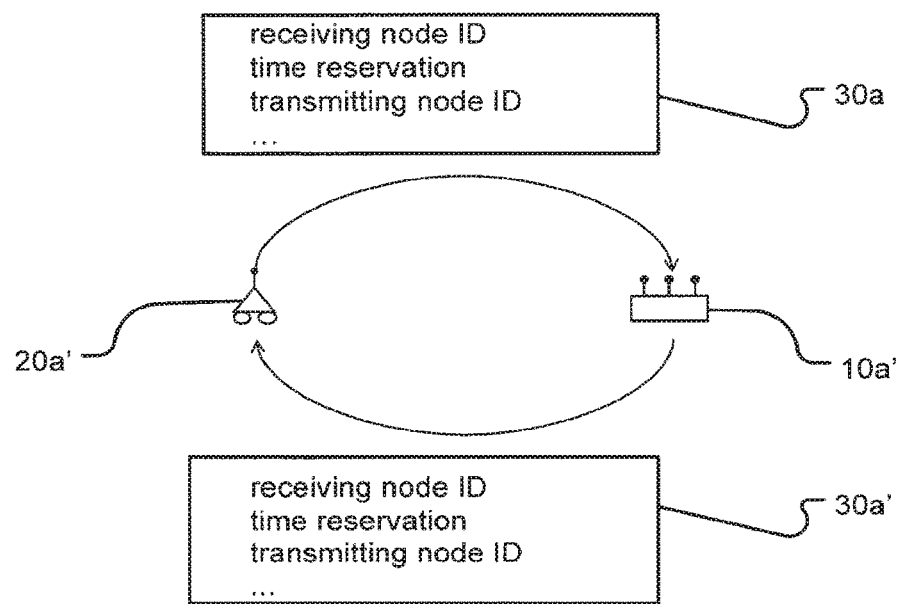
FIG. 10b illustrates information included in the omni-directional pilots according to one aspect of the disclosure.

FIG. 10b illustrates the contents of the respective signals, which in this example is the source and destination identity. However, this example may be implemented using any information within the pilots.

Figure 11A:
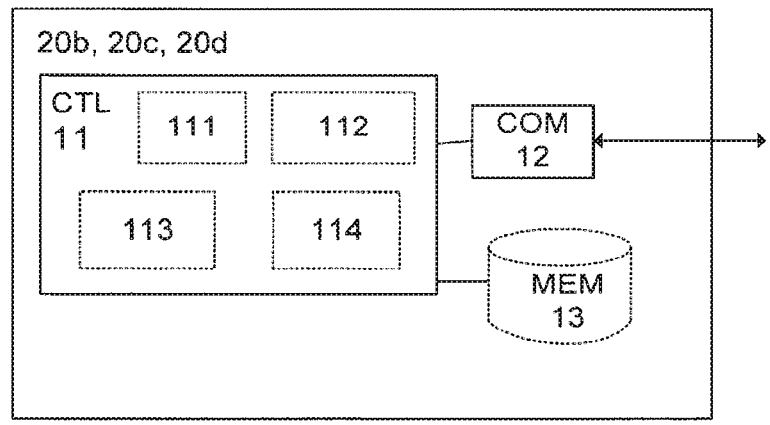
FIG. 11a is a block diagram illustrating a node receiving a pilot signal.
Figure 11B:
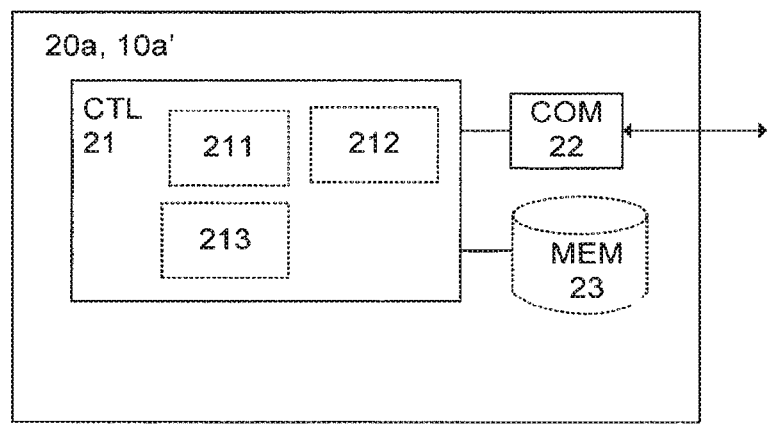
FIG. 11b is a block diagram illustrating a node transmitting a pilot signal.

Turning now to FIGS. 11a and 11b schematic diagrams illustrating some modules of an exemplary embodiment of a first node 20b, 20c, 20d and a second node 20a, 10a' will be described. In this application the term node is generally used, A node is any wireless device in a wireless communication system. Hence, the node may be an access point 10a-e, a user equipment 20a-e or any other device in the wireless communication comprising means for accessing the shared media.

The nodes comprise a controller, CTL, or a processing circuit 11, 21 that may be constituted by any suitable Central Processing Unit, CPU, microcontroller, Digital Signal Processor, DSP, etc. capable of executing computer program code. The computer program may be stored in a memory (MEM) 13, 23. The memory 13, 23 can be any combination of a Read And write Memory, RAM, and a Read Only Memory, ROM. The memory 13,23 may also comprise persistent storage, which, for example, can be any single one or combination of magnetic memory, optical memory, or solid state memory or even remotely mounted memory. The network nodes further comprises a communication unit (i/f) 12,22 arranged for wireless communication with other devices or nodes.

FIG. 11a discloses a first node 20b, 20c, 20d configured for accessing a shared media for directive signal transmission from the first node. When the above-mentioned computer program code is run in the processing circuit 11 of the first node, i.e. node 20b in FIG. 6a or FIG. 9, node 20c in FIG. 7 or node 20d in FIG. 8b, it causes the first node 20b, 20c, 20d to receive, using the communication unit 12, from a second node 20a, 10a', a pilot signal 30a, 30a' announcing a directive signal transmission 40a to or from the second node 20a, 10a', predict, based on information in the received pilot signal 30a, 30a', a collision rate between an intended directive signal transmission 40b,40c,40d from the first node 20b, 20c, 20d and the announced directive signal transmission 40a, the information defining the channel resources used by the announced directive signal transmission 40a and access, using the communication unit 12, the shared media based on the predicted collision rate.

According to one aspect of the disclosure the processing circuitry comprises:
  a receiver module 111 configured for receiving, from a second node 20a, 10a'', a pilot signal 30a, 30a' announcing a directive signal transmission 40a to or from the second node 20a, 10a',
  a predictor 112 configured for predicting S2 based on information in the received pilot signal 30a, 30a', a collision rate between an intended directive signal transmission 40b,40c,40d from the first node 20b, 20c, 20d and the announced directive signal transmission 40a, the information defining the channel resources used by the announced directive signal transmission 40a and
  an access module 113 configured for accessing S3 the shared media based on the predicted collision rate.

According to one aspect the processing circuitry further comprises an adopter module 114 configured to adopt the intended directive transmission from the first node in order to avoid collision between the directive transmission from the first node and the announced directive transmission.

The receiver module 111, the predictor 112, the access module 113 and the adopter module 114 are implemented in hardware or in software or in a combination thereof. The modules 111, 112, 113 are according to one aspect implemented as a computer program stored in a memory 13 which run on the processing circuit 11.

FIG. 11b discloses a second node i.e. node 20a in FIGS. 6-8 or node 10a' in FIG. 9a, in a wireless communication system, configured for reserving a shared media for directive signal transmission to or from the second node.

When the above-mentioned computer program code is run in the processing circuit 21 of the node, it causes the node to configure a pilot signal 30a, 30a' to announce a directive transmission 40a, include in the pilot signal 30a, 30a' information defining the channel resources used by the announced directive signal transmission 40a, the information enabling a receiving node 20b, 20c, 20d to predict a collision rate between a potentially colliding intended directive signal transmission 40b, 40c, 40d from the receiving node and the announced directive signal transmission 40a. The node is further configured to transmit, using the communication unit 22, the pilot signal 30a, 30a' to reserve the shared media.

According to one aspect of the disclosure the processing circuitry 21 comprises:
- a configurer 211 for configuring a pilot signal 30a, 30a' to announce a directive transmission 40a;
- an includer 212 for including in the pilot signal 30a, 30a' information defining the channel resources used by the announced directive signal transmission 40a, the information enabling a receiving node 20b, 20c, 20d to predict a collision rate between a potentially colliding intended directive signal transmission 40b, 40c, 40d from the receiving node and the announced directive signal transmission 40a; and
- a transmitter module 213 for transmitting the pilot signal 30a, 30a' to reserve the shared media.

The configurer 211, the includer 212 and the transmitter module 213 are implemented in hardware or in software or in a combination thereof. The modules 211 to 213 are according to one aspect implemented as a computer program stored in a memory 23 which runs on the processing circuit 21.

The first and the second nodes are further adapted to implement all the variants of the disclosure described in relation to the methods above.

Hence, according to a further aspect the disclosure relates to a computer program, comprising computer readable code which, when run on a processing circuit of a node in a cellular communication system, causes the node to perform any of the methods described above.

According to one aspect, the pilot signals have a narrower bandwidth than the directive signal transmission between the second node and at least one further node. As described above, in the proposed system, each transmitting node transmits pilot signals in addition to its directive data signals to reserve the medium. Since omni-directional signals are received at potential receivers with less power than directive transmissions the duration of omni-directional pilot signals need to be sufficiently long so that enough energy can be conveyed to enable detection.

In an ultra-dense deployment there may be many transmitting nodes transmitting omni-directional pilots to test the medium. To keep the amount of system resources used for omni-directional pilot transmissions small it is proposed to make each pilot rather narrowband. Since the amount of data to be communicated with the omni-directional pilots signals is small this is no problem. On the contrary, channel estimation is simpler if only a narrowband channel has to be estimated potentially improving performance. The use of narrow bandwidth has the additional advantage of boosting the power spectral density of the received waveform relative to the noise floor, potentially improving detection probability and synchronization performance.

Figure 12:
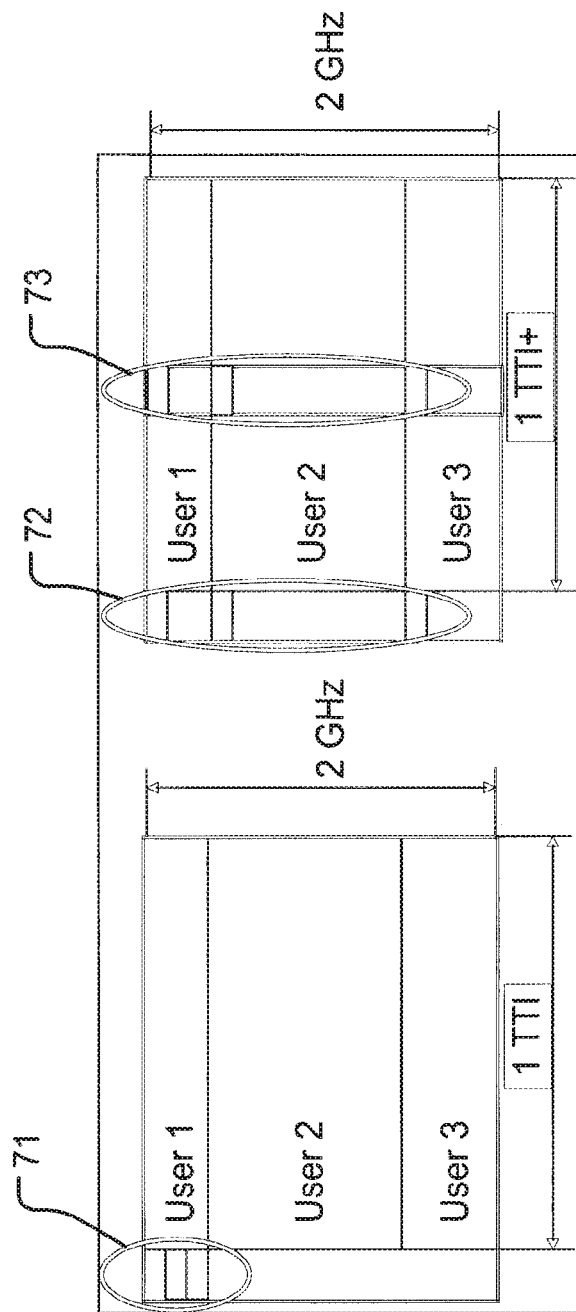
FIG. 12 illustrates the time-frequency structure of omni-directional pilots

If instead of omni-directional pilots directive pilot transmissions are used this is less of an issue since they are received with higher power, i.e. they can be shorter than if they would be omni-directional. FIG. 12 shows graphical illustrations how omni-directional pilot signals could be embedded into the time-frequency plane. In FIG. 12 on the left side omni-directional pilots 71 are prefixed to a TTI. As shown in the figure they are short compared to the TTI to reduce overhead and delay but still sufficiently long to enable reliable detection at the receiver. In FIG. 12 on the right hand side omni-directional pilots 72, 73 are both prefixed to a TTI but also inserted in a TTI. The pilot signals 73 within a TTI are used to test medium for already the next TTI.

Frequency slots used by one transmitter can either be constant, e.g. semi-statically configured, over time or can vary from transmission instance to instance, i.e. hop in frequency domain. Advantage of the latter approach is frequency diversity. Hopping is preferred in situations where many users share the channel to send pilot signals when connected, and a fewer number of users are in active data communication. Users in idle mode need not transmit pilots. The pilot signal can also consist of two or multiple disjoint frequency portions; in this case the bandwidth occupied by the pilot signal is the sum of the disjoint portions and is still smaller than the bandwidth of the directive transmission.

If the communication system has also access to lower bands e.g. assume the system mainly operates in the MMW bands but also has access to lower frequency bands the omni-directional pilot signals could be transmitted in the lower frequency bands. Due to the longer reach of omni-directional radio signals at lower frequency (the antenna aperture of omni-directional antennas and the received power increase with decreasing frequency) shorter (compare to MMW band) omni-directional pilot signals may suffice.

As mentioned above, since the omni-directional pilot signal is not beam formed, it may have to be transmitted over rather narrow bandwidth waveform for sufficient amount of time in order to reach the potential interfering transmitters.

The invention claimed is:

1. A communication system, comprising:
   a first node; and
   a second node,
   wherein the first node comprises:
      a transmitter; and
      first processing circuitry associated with the transmitter, the first processing circuitry being configured to:
         configure a pilot signal to announce a directive signal transmission between the second node and at least one further node, the pilot signal having a narrower bandwidth than the announced directive signal transmission between the second node and the at least one further node;
         include, in the pilot signal, information defining channel resources used by the announced directive signal transmission; and
         transmit, via the transmitter, the pilot signal to the second node; and
   wherein the second node comprises:
      a receiver; and
      second processing circuitry associated with the receiver, the second processing circuitry being configured to:
         receive, via the receiver, the pilot signal from the second node;
         predict, based on information in the pilot signal, a collision rate between an intended directive signal transmission from the first node and the announced directive signal transmission; and access, based on the predicted collision rate, a shared media for directive signal transmission between the first node and the second node.

2. The communication system according to claim 1, wherein the intended directive signal transmission and the announced directive signal transmission are at least partly overlapping in time domain.

3. The communication system according to claim 1, wherein in predicting the collision rate, the second processing circuitry is further configured to:

estimate interference between the intended directive signal transmission and the announced directive signal transmission.

4. The communication system according to claim 3, the second processing circuitry is further configured to:

adopt the intended directive signal transmission from the first node to:

avoid collision between the intended directive signal transmission and the announced directive signal transmission, and maintain the interference between the intended directive signal transmission and the announced directive signal transmission below a predetermined level.

5. The communication system according to claim 1, wherein the first processing circuitry is further configured to:

include, in the pilot signal, at least one of a source identity or a destination identity of the announced directive signal transmission.

6. The communication system according to claim 5, wherein the second processing circuitry is further configured to:

predict the collision rate based on the at least one of the source identity or the destination identity.

7. The communication system according to claim 1, wherein the first processing circuitry is further configured to:

include, in the pilot signal, spatial information of the announced directive signal transmission.

8. The communication system according to claim 7, wherein the second processing circuitry is further configured to:

predict the collision rate based on the spatial information.

9. The communication system according to claim 1, wherein the first processing circuitry is further configured to:

include, in the pilot signal, frequency information of the announced directive signal transmission.

10. The communication system according to claim 9, wherein the second processing circuitry is further configured to:

predict the collision rate based on the frequency information.

11. The communication system according to claim 1, wherein the communication system operates on a super high frequency band above 3 GHz.

12. The communication system according to claim 1, wherein the pilot signal is omnidirectional.

13. The communication system according to claim 1, wherein the pilot signal is a directive transmission.

14. The communication system according to claim 1, wherein the announced directive signal transmission is a signal transmission from the second node.

15. The communication system according to claim 1, wherein the announced directive signal transmission is a signal transmission from the at least one further node to the second node.

16. The communication system according to claim 1, wherein the first processing circuitry is further configured to include, in the pilot signal, an identity that is a node identity.

17. The communication system according to claim 16, wherein the identity is a group identity of a group of nodes in the communication system.

18. The communication system according to claim 1, wherein the pilot signal comprises a request to transmit data.

19. The communication system according to claim 1, wherein the pilot signal comprises a clear to send message.

20. A method performed by a communication system comprising a first node and a second node, the method comprising:

configuring, by the first node, a pilot signal to announce a directive signal transmission between the second node and at least one further node, the pilot signal having a narrower bandwidth than the announced directive signal transmission between the second node and the at least one further node;

including by the first node, in the pilot signal, information defining channel resources used by the announced directive signal transmission;

transmitting, by the first node, the pilot signal to the second node;

predicting by the second node, based on information in the pilot signal, a collision rate between an intended directive signal transmission from the first node and the announced directive signal transmission; and accessing by the second node, based on the predicted collision rate, a shared media for directive signal transmission between the first node and the second node.

* * * * *